Dec. 9, 1958 J. B. SMITH 2,863,522
OIL AND GAS TREATER
Filed Jan. 13, 1958 3 Sheets-Sheet 1

INVENTOR
JAMES BERNARD SMITH

BY Albert H. Kirchner
ATTORNEY

Dec. 9, 1958    J. B. SMITH    2,863,522
OIL AND GAS TREATER
Filed Jan. 13, 1958    3 Sheets-Sheet 2
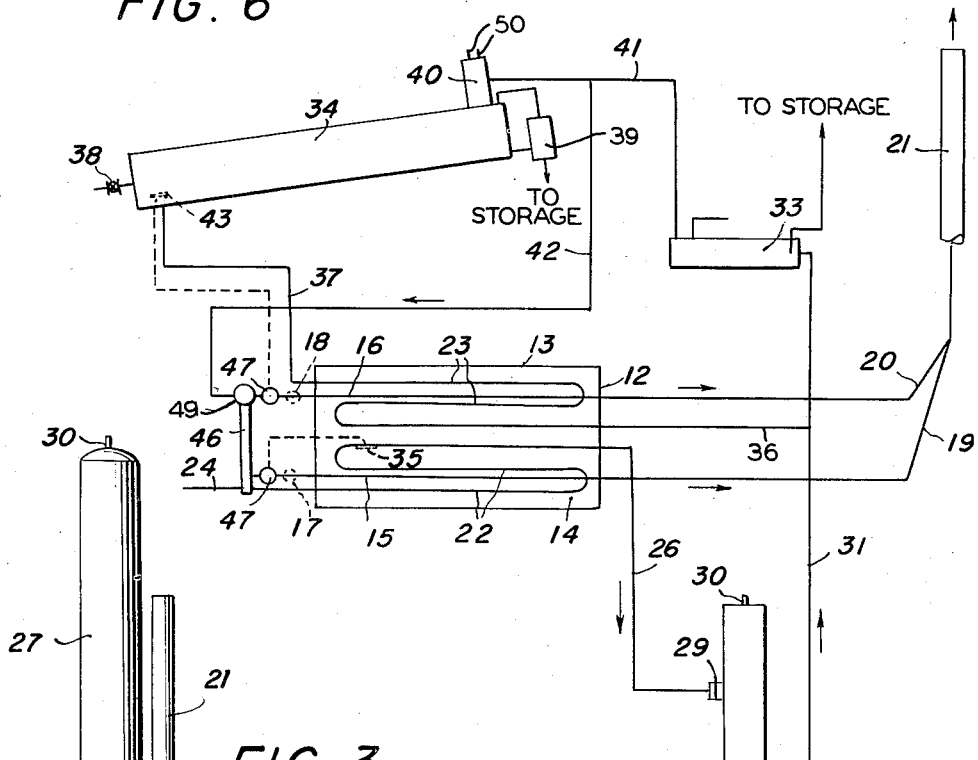
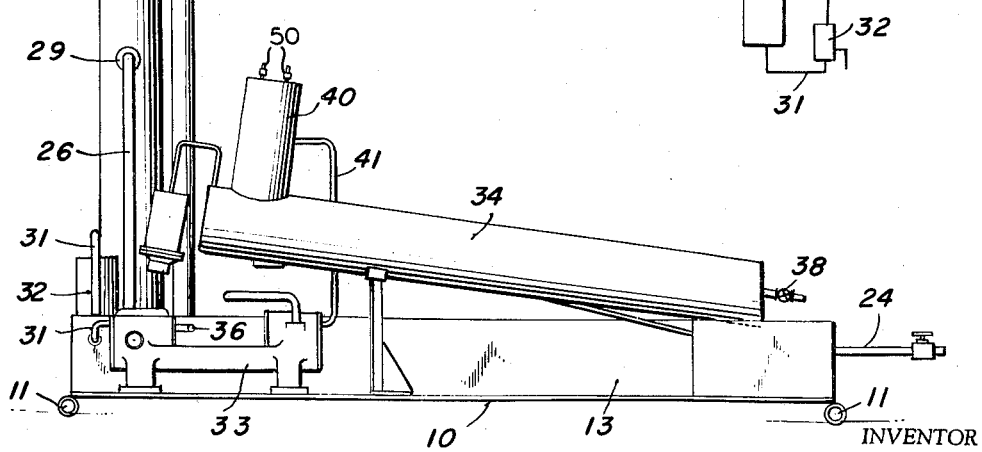
INVENTOR
JAMES BERNARD SMITH
BY Albert H. Kirchner
ATTORNEY Dec. 9, 1958     J. B. SMITH     2,863,522
OIL AND GAS TREATER
Filed Jan. 13, 1958     3 Sheets-Sheet 3
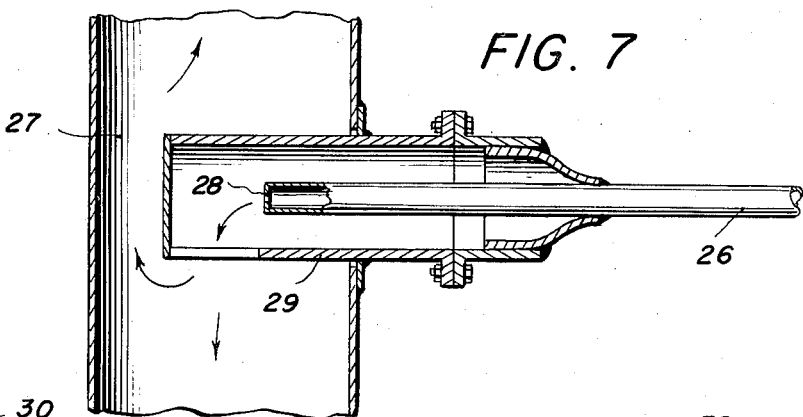
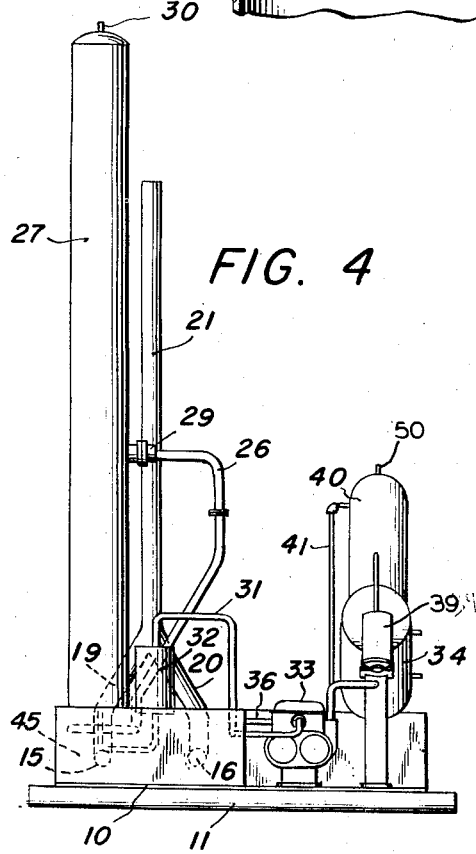
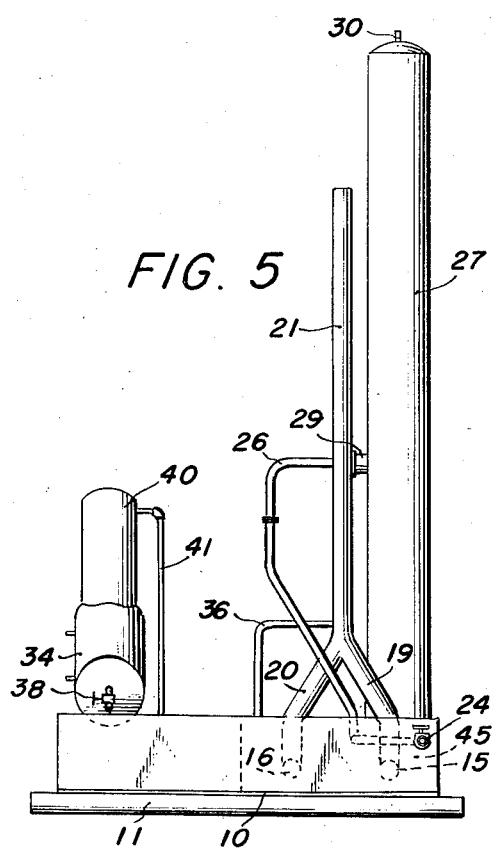
INVENTOR
JAMES BERNARD SMITH
BY Albert B. Kirchner
ATTORNEY

United States Patent Office 2,863,522
Patented Dec. 9, 1958

2,863,522

OIL AND GAS TREATER

James Bernard Smith, Aztec, N. Mex.

Application January 13, 1958, Serial No. 708,564

8 Claims. (Cl. 183—2.7)

The present invention relates to new and useful improvements in apparatus and method having for their object the separation of gas and oil from mixtures thereof.

The present application is a continuation-in-part of my application Serial No. 483,409, filed in the Patent Office January 21, 1955, now abandoned, which in turn was a continuation-in-part of my application Serial No. 410,169, filed in the Patent Office February 15, 1954, now abandoned.

The invention relates broadly to methods of and apparatus for the treatment of connate well fluids produced by the free flow or pumping of oil and gas wells.

While some wells may penetrate a gas zone in the earth formation and thus produce only gas which may be directly delivered for use, and while other wells may strike deposits of petroleum containing little or no gas or water, most well fluids are mixtures or emulsions of oil and water, containing varying quantities of occluded gas. Before the liquid hydrocarbon constituent of the fluid can be refined, as by means of cracking processes and the like, and before such occluded gas can be utilized, the gas must be liberated and the water separated from the oil. Within the earth formation these fluids are usually under considerable pressure retaining the gas in its occluded condition in the emulsion. Some of such pressures and/or pumping pressures are retained on the fluid delivered from the well through the pipe lines to a separation point. At such point release of pressure liberates the gas, and means are provided for the separation of oil from water. It has long been customary to provide separation apparatus at or adjacent one or more well heads by means of which the connate fluids may be separated into their components of oil, water and gas, and it is to such apparatus and their method of operation that the present invention relates.

Prior equipment of this general type has frequently included separate apparatus for the separation of the gas from the liquid constituents, with additional means for effecting separation of water from the hydrocarbon liquid. In both instances, and/or where these instrumentalities were combined, complicated apparatus was required and the equipment was low in efficiency and uneconomical due to its high fuel or power requirements. Furthermore, considerable difficulty was encountered with respect to temperature and pressure controls. Since the well fluid is delivered under pressure, and since natural temperatures vary widely with changes of season, freezing of the water and resulting blockage of the equipment was apt to occur as the gas expanded upon its release.

The present invention is designed for the efficient and economic separation of well fluids containing water, oil and gas, by the maintenance within the equipment of separate specific temperature zones calculated as the most effective for the separation of the several constituents and by the use of the gaseous by-product of the separation for the maintenance of the desired temperatures and to serve as the operating power for the requisite pumping of the fluids.

A primary and general object of the invention therefore is the provision of a novel, simple and efficient method of and apparatus for the separation of connate well fluids into their constituents of oil, water and gas.

More specifically, an object of the invention is to provide for the maintenance, within a well fluid separator, of individual zones of temperature each most efficiently adapted to separate distinct and different components of the fluid.

Another object is to provide, in apparatus of the type indicated, a minimum temperature zone enclosure around the outside of certain separators and valves and connecting lines in order to prevent freezing and sluggishness of the fluid in these parts.

A further object is to provide a circulating pump for the pickup of an emulsion of liquids escaping from the apparatus.

Another object is to provide a method of and apparatus for separation of the constituents of a well fluid which utilizes for the required heat and power one of the separated constituents.

A further object is to provide a method and apparatus of the class indicated by which temperatures and pressures are maintained which will preclude condensation or congelation at undesirable points notwithstanding side fluctuation in the surrounding ambient temperature.

Other objects, features and advantages of the invention will be apparent to those skilled in the art from a consideration of the following specification, taken in conjunction with the accompanying drawings illustrating a preferred embodiment of the invention, in which Figure 1 is a plan view of the apparatus;

Fig. 3 is a side elevational view taken from what may be regarded as the rear of the apparatus, shown at the top of Fig. 1;

Fig. 4 is an end elevational view taken from the right hand end of Fig. 1;

Fig. 5 is an end elevational view taken from the left hand end of Fig. 1;

Fig. 6 is a purely schematic view of the several component parts of the apparatus and the fluid flow paths therethrough; and Fig. 7 is a detail sectional view on a relatively enlarged scale of the connection between the gas flow line and the expander.

Figure 1:
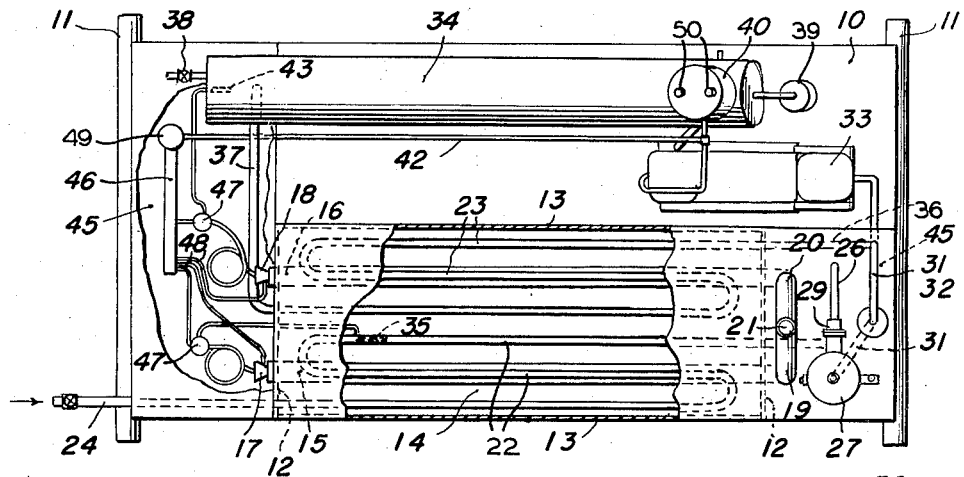
Figure 2:
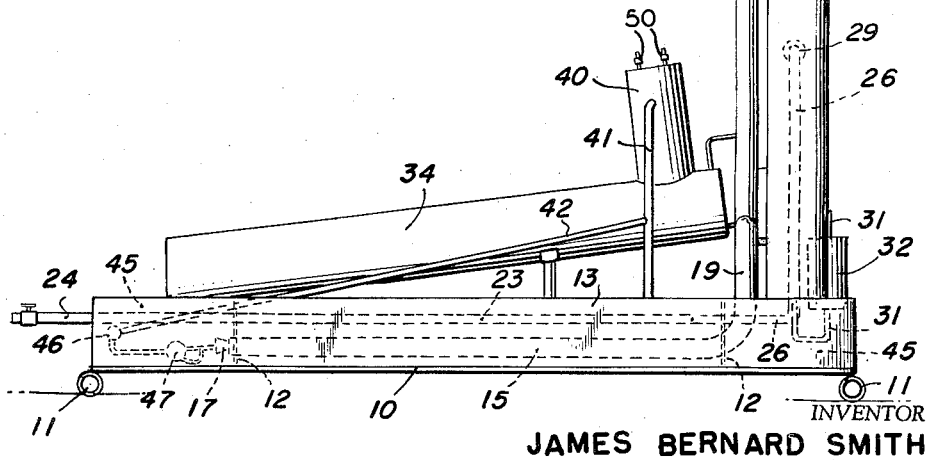
Fig. 2 is a side elevational view taken from what may be regarded as the front of the apparatus shown at the bottom of Fig. 1.

In the form of apparatus shown by these figures, the structure includes a generally rectangular base platform 10, preferably provided with end handling bars or handles 11 to facilitate handling and transportation of the assembly. Mounted at one side of the platform 10 and defined by end and side walls 12 and 13, respectively, is provided a temperature zone control box of generally rectangular shape. This box is extended to each end with an enclosure 45 that holds radiated heat around the outside of the separators 27 and 34 and all connecting valves and lines. The combined box and extended wings are disposed with one side parallel to one side edge of the platform, and the temperature zone control box is filled with a material 14 of low heat conductivity, such as sand, earth or analogous granular or pulverulent material, preferably such as may be inexpensively obtained at the site of operation. Embedded within this heat-conserving material of the box is a parallel pair of separately fired heating chambers 15, 16, each extending through the ends 12 and longitudinally through the box. At the front or left hand end of the structure as seen in Figs. 1 and 2, the heating chambers 15 and 16 communicate with individual burners 17 and 18, respectively, while at their opposite ends the chambers are provided with exhaust flues 19 and 20, respectively, communicating with a stack 21.

Also located within the box, and closely adjacent to the heating chambers 15 and 16, are undulated heat exchange tubings 22 and 23, each preferably including at least one length disposed directly over its associated heating chamber. Thus the tubing 22 is maintained at a temperature controlled by that of the heating chamber 15, while the tubing 23 is maintained at a temperature controlled by the chamber 16.

The oil well fluid delivered by pipe line from one or more well heads is admitted under pressure by pipe 24 to the tubing 22, through which it is circulated. The well fluid under pressure is delivered from the tubing 22 through delivery pipe 26 to the gas expander column 27 through the medium of the connection shown in Fig. 7, where the pipe 26 is shown provided with a restrictor discharge orifice 28 and its end is enclosed by a surrounding fitting 29 which shields the delivery of the expanding gas. The associated heating chamber 15 maintains the fluid in tubing 22 at such temperature that the expansion temperature, or the temperature in the expansion chamber, will be approximately 39.2° F.

Since water at 39.2° F. is at its maximum specific gravity, and since at this temperature the oil will not volatilize, this temperature is optimum for the separation of the gas from the two kinds of liquids. Thus, as the gas expands within the expansion chamber it rises to the top of the chamber and is discharged through the pipe 30, while the liquids pass downwardly to be drawn off through the pipe 31, which includes a liquid level valve and by-pass 32. The discharge pipe 36 of pump 33 joins pipe 31 to form heating coil 23. Preferably, when required, the pump will be powered by gas under pressure, rising from the separator chamber 34, hereinafter explained.

It will be observed that within the expander 27 the pressure of the well fluid is released and thus as the gases are released and expand there will be a material cooling of the chamber and the fluid. Such expansion and cooling effect will insure a temperature of at least as low a point as the desired 39.2° F. It is important that the temperature be maintained at substantially 39.2° F. to preclude freezing of the water content of the fluid. The rate of fluid flow to the chamber will in part determine the chamber temperature; hence the restricted orifice 28 acting as a choke. If desired, a variable choke may be used in the line.

Since well pressures may vary and outside temperatures fluctuate, the invention provides for preheating of the fluid in the heat exchange tubing 22. As diagrammatically illustrated, the fuel supply to the burner is automatically controlled by the thermostat 35 so as to maintain a temperature to expansion balance insuring maintenance of this desired temperature for maximum gas separation and to prevent freezing. This control may be moved to connection 29 in the separator 27, or another may be added to work with the thermostat 35 to increase efficiency. If desired, a temperature gauge may be placed in this fitting to enable readings to be taken.

From the expansion chamber 27 the liquid components pass through pipe 31 and valve 32, and join the discharge in pipe 36 of pump 33 to enter the second heat exchange coil 23 where heat is applied through the heating tube 16 to raise the liquid temperature to between 90° and 110° F. At this temperature the specific gravity differential between water and the oil is at its peak and thus such temperature is optimum for the separation of the liquids. From the tubing 23 the liquid constituents pass to the inclined separation chamber 34 through delivery tubing 37. The movement of the liquid in chamber 34 is slower than in the coil 23 because of the enlarged size of the chamber. This sluggishness of motion, with control 43 holding the temperature at the desired level, will promote separation of water from the oil. Upon separation of the liquids, water will pass to the bottom of the separator to be drawn off through the valve-controlled discharge pipe 38 while the separated oil is delivered from the upper discharge valve 39 to be stored in a tank or plurality of tanks (forming no part of the invention) for fractionation distillation or cracking at the refinery. Pump 33 is to be used to reclaim for recirculation into coil 23 and separator 34 any emulsion passing the valve 39 before being separated into the liquid components. At the upper end of the separation chamber 34 a supplemental gas collection chamber 40 is provided for the collection of any further gas which may be separated from the liquid constituents in the chamber 34.

Gas from the chamber 40 is delivered to the pump 33 through pipe 41 to motivate the pump and such gas is also supplied through pipe 42 to the burner 17 thermally controlled by the thermostat 35 and to the burner 18 controlled by the thermostat 43 in the chamber 34 to maintain the separate temperatures described. From the pipe 42 the gas flows through regulator 49 to manifold 46 and thence through thermostatically controlled valves 47 to the burners with pressure release valves 50 maintaining a desired pressure in chamber 40 for proper operation. Pilot lines 48 insure relighting of the burners after they are closed down.

The method of the present invention may be generally defined as including the steps of first subjecting the connate well fluids to a controlled temperature of approximately 39.2° F. whereby the gas is separated from the liquids, thereafter and as a second step subjecting the liquid constituents to a temperature of approximately 90° to 110° F. so that it may be most efficiently separated from the hydrocarbon liquids. In the process some of the gas separated from the original fluid is used for driving the circulating pump for the liquids and is also utilized as fuel for the burners of the heat exchange devices. Meanwhile a minimum temperature zone is maintained inside of the enclosures around the separators and connecting lines and valves, using the heat radiated from the burners and pilot burners and heated pipes with a pump included for reclaiming any untreated liquids passing through the unit.

It will be understood that both as to method and as to apparatus the invention may be practiced with numerous changes and modifications from the specific details herein set forth, and consequently various changes, modifications and the full use of equivalents may be resorted to without departure from the spirit or scope of the invention as set forth in the appended claims.

I claim:

1. Apparatus for separating oil and gas from a free flowing stream thereof containing water comprising a firebox, tube means therein for heating said stream to a predetermined temperature, an expander connected to said tube means for effecting separation of gas therefrom, second tube means extending through the firebox for conducting liquid from the expander and maintaining the same at a predetermined temperature, and a separator connected to said second tube means for effecting gravity separation of the oil and water in said liquid.

2. Apparatus as claimed in claim 1, including fire tube means in the firebox and a dirt fill of low heat conductivity permanently contained in the firebox between said fire tube means and said first and second tube means.

3. Apparatus as claimed in claim 1, including fire tube means in the firebox in heat exchange relationship with said fire and second tube means and burner means supplying heat to said fire tube means including a pilot burner for maintaining a predetermined minimum heat in said first and second tube means.

4. Apparatus for separating oil and gas from a free flowing stream thereof containing water comprising a firebox, tube means therein for heating said stream to a controlled temperature of approximately 39.2° F., an expander connected to said tube means for effecting separation of gas from said stream, second tube means extending through the firebox for conducting liquid from the expander and maintaining the same at a controlled temperature of approximately 90° F. to 110° F., and a separator connected to said second tube means for effecting gravity separation of the oil and water in said liquid.

5. In apparatus of the class described, a burner tube, a well fluid coil in heat exchange relation to said tube, an expander column, means for passing well fluid through said coil to said expander column, a second burner tube, a second coil in heat exchange relation with said second burner tube, means for delivering liquid well fluid components from said expander column to said second coil, a liquid separator, and means for delivering said liquid components from said second coil to said separator.

6. In apparatus of the class described, a heat zone control box filled with granular material of low heat conductivity, a first burner tube within said material, a well fluid coil in said material in heat exchange relation with said first burner tube, an expander column, means for passing well fluid through said coil to said column, a second burner tube in said material, a second coil in said material in heat exchange relation to said second burner tube, means for delivering liquid well fluid components from said expander column to said second coil, a liquid separator, and means for delivering said liquid components from said second coil to said separator.

7. The combination claimed in claim 6, including means for controlling the flow of fuel to said burner tubes to maintain the temperatures within said expander column and said separator at predetermined operating optimums.

8. The combination claimed in claim 6, including means for controlling the flow of fuel to said burner tubes to maintain the temperature within said expander column at substantially 39.2° F. and that within the separator at substantially 90° to 110° F.

References Cited in the file of this patent

UNITED STATES PATENTS

| | | |
|---|---|---|
| 2,610,698 | Lovelady et al. | Sept. 16, 1952 |
| 2,758,665 | Francis | Aug. 14, 1956 |